Oct. 29, 1940. L. FERSING 2,219,984
VARIABLE SPEED TRANSMISSION
Filed April 6, 1938 3 Sheets-Sheet 1

Inventor:
Leif Fersing
By Charles A Warren
Attorney

Oct. 29, 1940.   L. FERSING   2,219,984
VARIABLE SPEED TRANSMISSION
Filed April 6, 1938   3 Sheets-Sheet 2

Oct. 29, 1940.      L. FERSING      2,219,984
VARIABLE SPEED TRANSMISSION
Filed April 6, 1938      3 Sheets-Sheet 3

Fig. 3.

Inventor:
Leif Fersing
By Charles A. Warren
Attorney

Patented Oct. 29, 1940

2,219,984

UNITED STATES PATENT OFFICE 2,219,984

VARIABLE SPEED TRANSMISSION

Leif Fersing, Springfield, Vt.

Application April 6, 1938, Serial No. 200,459

7 Claims. (Cl. 74—189.5)

The present invention relates to a variable speed transmission, and particularly to one which operates with a high efficiency at all output speeds, although the speed variations, between limits, are infinite.

In prior devices of this character variations in speed are obtained through entirely mechanical elements, as for example, the familiar automotive transmission, in which the speed variations of the driven shaft are dependent upon the sizes of the gears. A later mechanical development is the V-belt cooperating with V-pulleys on the driving and driven shafts, with a provision for adjusting the spacing of the flanges on each of the pulleys, thereby changing the effective pitch of the pulleys. Drives of this character have a very small speed range and frictional losses in this type of transmission are substantial. As the power transmitted is controlled by the size of the driving belt, the transmissions of this type are limited to relatively low horsepower.

Another type of variable speed unit is the hydraulic unit where a variable capacity pump on the driving shaft drives a variable or constant displacement pump on the driven shaft, there being no mechanical connection between the driving and driven shafts. Here again the transmissions must be of relatively low horsepower since all of the power is transmitted in the form of pressure and volume of fluid pumped.

The principal object of the present invention is to overcome the objections to variable speed transmissions of the above character by providing a unit where the speed variations are infinite, between limits, and where the power losses are reduced to a minimum. In accordance with the present invention, the driving and driven shafts are connected together by a differential unit which allows for a relative rotation, and the relative speeds are controlled by limiting the rotation of the differential unit. The rotation of the differential unit is utilized to generate power which is returned to either the driving or driven shaft through a suitable motor.

Other and further objects and advantages of the present invention will appear from the following detailed description taken in connection with the accompanying drawings, in which—

Fig. 3 is a sectional view through a transmission, showing a modification.

Fig. 4 is a side elevation of the transmission of Fig. 1.

Like reference characters refer to like parts in the different figures.

Figure 1:
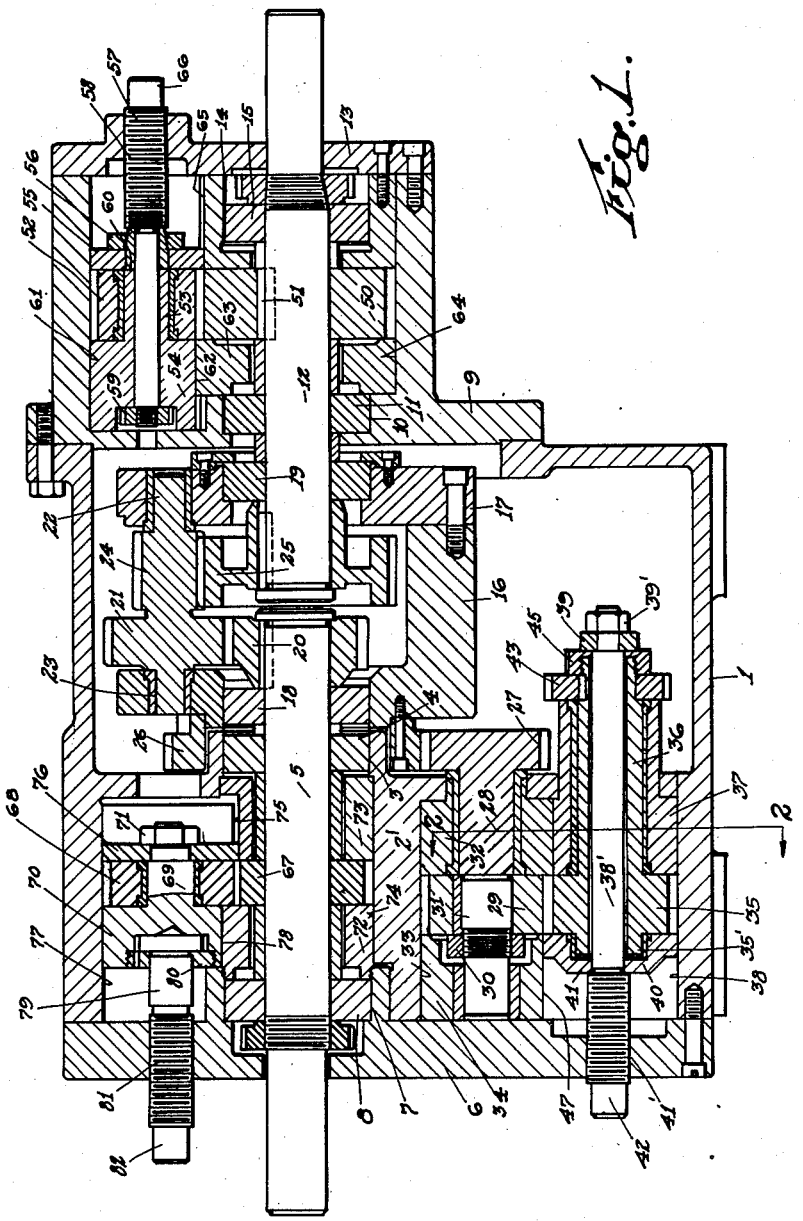
Fig. 1 is a sectional view through a transmission showing one embodiment of the invention.

With reference first to Fig. 1, the device of the invention comprises a base 1 having a partition 2 therein, the latter having a bore 3 to receive bearings 4 in which the drive shaft 5 is journalled. A cap 6 on the end of the base 1 has a bore 7 in alinement with the bore 3 for a bearing 8, also supporting the shaft 5. A casing 9 secured to the base 1 at the end opposite to the cap 6 has a bore 10 to receive a bearing 11 which supports a driven shaft 12, and a cap 13 on the end of the casing 9 holds in place within the casing a sleeve 14 in which is positioned a bearing 15, also supporting the driven shaft 12. In the arrangement shown, the drive shaft 5 and driven shaft 12 are in alinement, the drive shaft 5 being connected to any suitable prime mover, not shown. It will be understood that the bearings above referred to may, if desired, be of any suitable anti-friction type for minimizing the friction in the device.

A housing 16 having a cap 17 secured thereto, is mounted within the base 1 and is journalled on bearings 18 and 19 on the drive shaft 5 and driven shaft 12 respectively. A pinion 20 on the end of the drive shaft 5 and positioned within the housing 16 is in mesh with planetary gears 21, only one of which is shown, said gears having integral stub shafts 22 which are journalled in bores 23 in the housing 16 parallel to and spaced from the axes of the driving and driven shafts. Integral with the planetary gears 21 are corresponding gears 24 which are in mesh with a pinion 25 on the end of the driven shaft 12.

The rate of rotation of the driven shaft is dependent upon the rate of rotation of the drive shaft and also upon the rotation of the spider, that is, the housing 16 and cap 17, which supports the planetary or differential gears. With a predetermined speed of the drive shaft, the rotation of the driven shaft is determined by the rate of rotation of the spider. In accordance with the present invention the spider is connected to a power generator and a motor driven by the generated power is connected to the drive or driven shaft.

It will be understood that the generator and motor act as speed governors and transmit only a part of the power between the driving and driven shafts. The differential or planetary gearing in itself transmits to the driven shaft that part of the power necessary to drive the generator. When the housing 16 is not rotating, that is when the motor connected thereto is not rotating, the generator is also stalled, and power will be transmitted entirely through the gears 21 and 24 from the driving to the driven shaft, and no power is transmitted through the motor and generator.

Secured to the housing 16 on the outside thereof and concentric with the drive shaft 5 is a ring gear 26 which is in mesh with a gear 27 on a shaft 28 mounted for rotation within the base. The shaft 28 is connected to a suitable generator which in this embodiment of the invention is a gear pump, although any other type of generator may be used if desired.

Positioned on the shaft 28 is a gear 29 held thereon by a clamping nut 30, a key 31 providing for rotation of the gear 29 with the shaft. A sleeve 32 is positioned between the gears 27 and 29 to provide a bearing for the shaft 28, and this sleeve fits in a bore 33 in the base 1, the bore corresponding in diameter to the gear 29. A second sleeve 34 is positioned in the bore 33 on the opposite side of the gear 29 and provides a bearing for the end of the shaft 28.

The gear 29 is in mesh with a gear 35 on a shaft 36 journalled in a sleeve 37 positioned in a bore 38 in the base 1, the bores 38 and 33 being parallel and interconnecting, as shown. The cooperating gears 29 and 35 together form a gear pump, the output of which is controlled by adjusting the axial position of the gears relative to each other, to vary the effective pumping area of the gear teeth.

For adjustment of the gear pump the gear 35 is made integral with the shaft 36 which is hollow to receive a centrally extending stud 38' on which the shaft is turnable, and the stud is secured against axial movement within the shaft 36 by a thrust washer 39 held on the end of the stud 38' by a clamping nut 39'. At the left side of the gear 35, Fig. 1, an integral hub 35' engages in a bearing provided by a cap 40 which is secured on the stud 38' and engages with a shoulder 41 thereon. The stud 38' is threaded to engage with a threaded bore 41' in the cap 6. Turning movement of the stud by means of its squared outer end 42 provides for axial movement of the gear 35 relative to the gear 29. The axial adjustment is sufficient to provide for entirely disengaging the two gears 29 and 35 to stop the action of the pump, and in order that the gears may be brought into mesh again without difficulty, the shaft 36 has keyed thereto a gear 43, which, when the gear 35 is shifted axially, moves into engagement with the gear 27 to cause a continuous rotation of the gear 35 at the same rate of speed as the gear 29, even if the cooperating gears 29 and 35 are not in mesh. The gear 43 is clamped on the shaft by a clamping ring 45.

Figure 2:
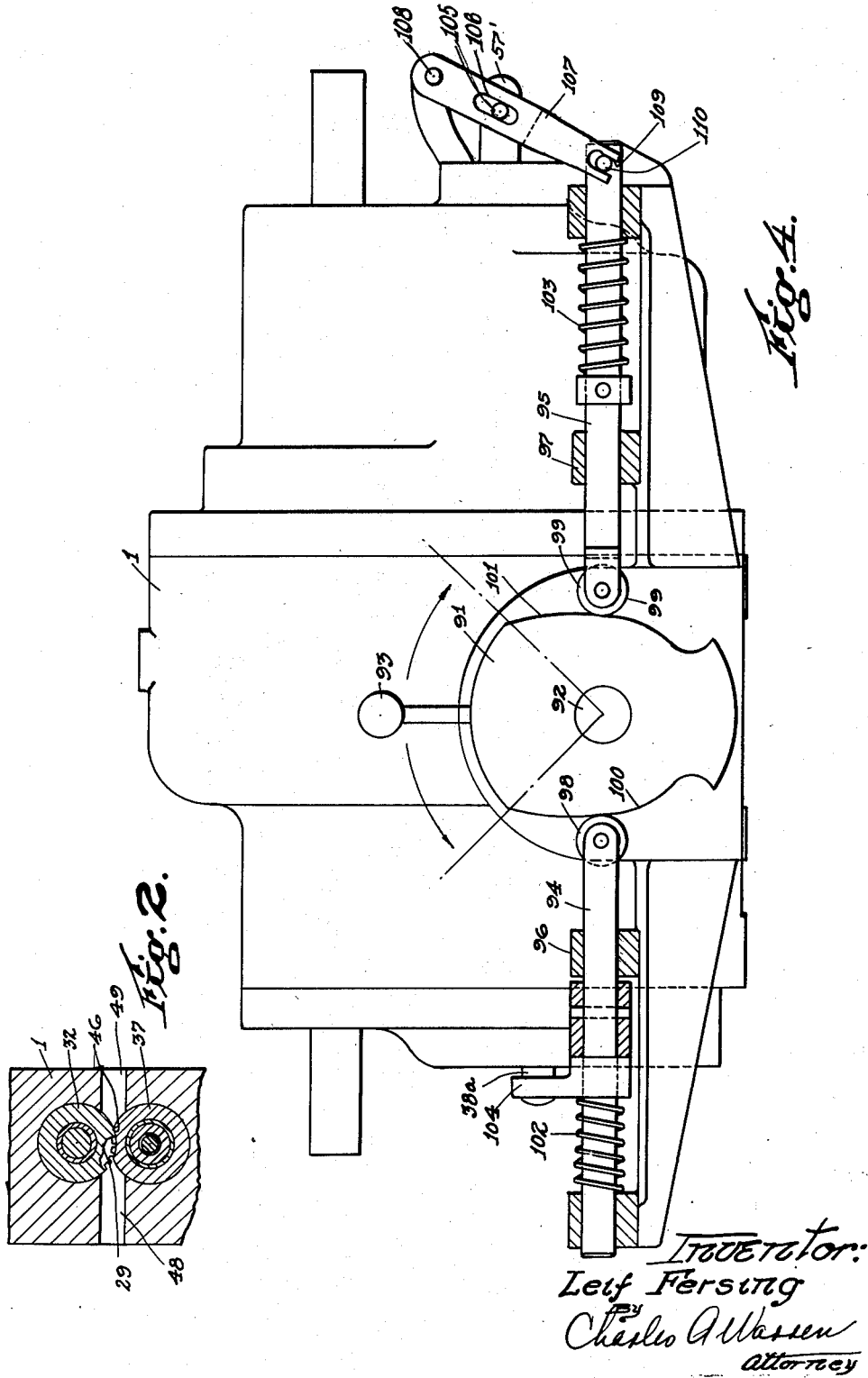
Fig. 2 is a sectional view along the line 2—2 of Fig. 1.

With reference to Fig. 2, the sleeve 32 has a cylindrical outer surface and the sleeve 37 has an arcuate recess 46 corresponding in radius to the addendum radius of the gear 29. As the gear 29 is held against axial movement on the shaft 28 by the clamping nut 30, the shaft is also held against axial movement within the sleeve 32 since the bearing surface provided by the sleeve extends between and engages the adjacent edges of the gears 27 and 29 respectively. The sleeve 34 has an arcuate recess 47 cooperating with the periphery of the cap 40 which has a cylindrical outer surface corresponding in diameter to the addendum diameter of the gear 35. By this arrangement the ends of the gears 29 and 35 are sealed against leakage independently of the relative position of the two gears. It will be apparent, as shown in Fig. 2, that the portion of the casing 1 in which the gear pump is positioned has intake and discharge openings 48 and 49 for the fluid, to which opening suitable conduits may be connected, as will hereinafter appear.

A motor in the form of a second gear pump is connected to the driven shaft 12, and as best shown in Fig. 1, the driven shaft has a gear 50 secured against rotation thereon, as by a key 51. A cooperating gear 52 is journalled on a hub 53 on a sleeve 54. A cap 55 is positioned on the sleeve and a clamping nut 56 holds the gear and cap in position. An adjusting rod 57 has a threaded portion 58 engaging with a portion of the cap 13, and the rod is held against sliding movement within the sleeve 49 by a clamping nut 59 which holds the sleeve against a shoulder 60 on the rod. The sleeve 54 engages in a cylindrical bore 61 in the casing 9 and has an arcuate recess 62 to receive a portion of the cylindrical periphery of a sleeve 63 surrounding the driven shaft 12 and positioned in a bore 64 in the casing 9. The bores 61 and 64 are parallel and intersecting, as will be apparent. The sleeve 14 which surrounds the driven shaft 12 and is positioned on the side of the gear 50 opposite to the sleeve 63 is also positioned in the bore 64 and has an arcuate recess 65 for engagement with a portion of the cylindrical periphery of the cap 55. Endwise adjustment of the rod 57 by means of the squared end 66 shifts the gears 50 and 52 axially relative to each other for controlling the amount of oil passing through the pump. In this case the gear pump acts as an hydraulic motor and provides for a rotation of the driven shaft 12.

In the operation of the device the drive shaft 5 is rotated at a predetermined rate of speed and if there were no structure to limit the rotation of the housing 16, the housing would rotate and there would be no resultant rotation of the driven shaft 12. However, as soon as the housing 16 begins to rotate, the generator, or first described gear pump, consisting of the cooperating gears 29 and 35, begins to direct fluid under pressure to the motor or second gear pump consisting of the gears 50 and 52. The latter, as above stated, acts as a motor and applies a torque to the driven shaft 12. The motor and generator, as above stated, transmit only a part of the power, the remainder being transmitted through the planetary transmission and as infinite adjustments of the generator and motor are available, any desired speed of the driven shaft is available up to the predetermined maximum established by the gear ratio of the planetary transmission.

The rate of rotation of the driven shaft 12 may be increased by shifting the gear 52 to the right, Fig. 1, thereby decreasing the amount of tooth surface of the gear 52 which is in contact with the gear 50. When this occurs the amount of oil which can pass through the motor at the given rate of rotation thereof is decreased and the motor must, accordingly, increase its rate of rotation to accommodate the amount of oil supplied to it by the generator or pumping gears 29 and 35. When the motor is adjusted to require a less amount of oil for each revolution thereof, the torque required to drive the generator increases and the housing 16 is slowed down with a resultant increase in the rate of rotation of the driven shaft 12 and a resultant increase in the rate of rotation of the motor until a stable condition is again reached.

Adjustment of the generator or gear pump, will also provide for varying the rate of rotation of the driven shaft 12 while the drive shaft 5 rotates at the same predetermined speed. When the gear 35 is shifted to the left the tooth contact between the gears 28 and 29 is decreased so that a smaller amount of oil is pumped. Since a smaller amount of oil is supplied to the hydraulic motor, the rate of rotation of the motor will also be decreased and the driven shaft 12 accordingly rotates more slowly with a corresponding faster rotation of the housing 16. It may be noted at this point that none of the power input through the shaft 5 is lost since all of the power is transmitted, either through the planetary gearing to the driven shaft, or through the generator and hydraulic motor. No friction brakes of any character are inserted in the structure and there is no corresponding power loss, other than the normal power loss, by reason of the fact that no mechanism of this character would be entirely efficient.

By the arrangement above described, the maximum rate of rotation of the driven shaft is limited, with a predetermined speed of the drive shaft, by the gear ratio of the planetary transmission, since the maximum rate of rotation is obtained when the housing 16 is stationary by reason of the motor being entirely disengaged. Instead of changing the ratio of planetary or differential gearing, the present invention incorporates a structure by which to obtain an overdrive, or a rotation of the driven shaft at a faster rate than would be possible if the housing 16 were held stationary. To this end another generator or gear pump is provided for rotation by the drive shaft 5. Referring to Fig. 1, a gear 67 is secured to the shaft 5 for rotation therewith and meshes with a gear 68 journalled on a pin 69 projecting from a cylindrical plug 70, the gear being held on the pin by a clamping nut 71.

Sleeves 72 and 73 are positioned on opposite sides of the gear 67 in a bore 74 in the housing 1 concentric to the drive shaft 5. The sleeve 73 on the right hand side of the gear 63 has an arcuate recess 75 for engagement with a portion of the cylindrical periphery of a cap 76 located on the right hand side of the gear 68 between the gear and the clamping nut 71.

The plug 70 and the cap 76 are positioned in and axially slidable in a bore 77 in the casing 1 and the plug has an arcuate recess 78 for engagement with a portion of the sleeve 72 on the left hand side of the gear 67. A headed stud 79 is held by a ring 80 against movement relative to the plug 70 and is threaded to engage in a threaded bore 81 in the casing 1. Rotation of the stud by means of the squared end 82 provides for axial movement of the gear 68 and the associated parts within the bore 77.

When this gear pump is utilized for an overdrive, the discharge side of this generator is connected to what has previously been the discharge side of the first generator, comprising the gears 29 and 35. When this occurs the oil delivered by the second generator is directed into the first generator so that the latter acts as an hydraulic motor and rotates the housing 16 in a direction opposite to that in which it would normally rotate, thereby providing for a rotation of the driven shaft 12 at a rate greater than the rate at which the driven shaft would turn if the housing 16 were held stationary.

It will be understood that the planetary gearing above described could readily be replaced by the familiar type of differential gearing and would function in exactly the same manner except that the direction of rotation of the driven shaft would be reversed. Moreover, in order to render the device universally operative, the pipe connections between the several gear pumps would be such that they could be interconnected in any desired arrangement for accomplishing the purposes above outlined.

In the structure above described, each gear pump is made up of one pair of spur, or helical gears. Although these pumps are entirely satisfactory it is desirable, in certain instances to substitute a double pump to provide for the use of helical gears and to avoid the axial thrust resulting from the use of a single pair of helical gears. Since the substitution of one type of gear pump for another would not involve invention, it is not essential to describe in detail any other types of gear pumps or other generator or motor constructions.

Instead of the planetary transmission of Fig. 1, it may be desirable to substitute a differential type of transmission, as shown in Fig. 3. With reference to this Figure, the housing 1' has a bore 3' to receive the bearings 4' in which a driving shaft 5' is journaled. A casing 9' is secured to the housing 1' and has mounted therein bearings 11' for the driven shaft 12'. The driving and driven shafts are in alinement and on the inner end of the driving shaft is a cross-stud 83 on the opposite ends of which are journalled bevelled gears 84 and 85. Gears 84 and 85 mesh with a bevel gear 86 secured as by a key 87 to the inner end of the driven shaft 12' and are also in mesh with a bevel gear 88 journalled on the inner end of the driving shaft 5'. A ring gear 89 is secured to the bevel gear 88 for rotation therewith and is in mesh with a gear, not shown, connected to a suitable generator, preferably in the form of a gear pump, in the manner in which the gear 26 is connected to the gear pump in the structure of Fig. 1.

Integral with the bevel gear 86 is a gear 90 which is connected to a motor, preferably in the form of a gear pump, in a manner similar to that in which the gear 26 is connected to the gear pump in the structure of Fig. 1.

In the operation of this modification rotation of the driving shaft 5' provides for a rotation of the cross-stud 83 and if the gear 89 is free to turn, there will be no rotation of the driven shaft 12'. However, when the rate of rotation of the ring gear 89 is controlled by the generator connected thereto, the relative rates of rotation of the driving and driven shafts is proportionately controlled. The power input to the generator or gear pump connected to the ring gear 89 is returned to the transmission through the gear pump or motor connected to the gear 90. This structure is intended to show the manner in which a differential may be utilized instead of the form of transmission of Fig. 1. In either event the connection between the driving and driven shafts is by a gearing which includes a member, either the housing 16 of Fig. 1, or the ring gear 89, which by its rate of rotation, controls the relative rates of rotation of the driving and driven shafts.

With reference now to Fig. 4, it is desirable in certain cases to have the generator and motor forming part of the transmission adjustable from a single control lever. When a pump in the form of a spur gear is utilized, or when a double pump to avoid axial thrust is utilized, it is possible to adjust the gear pumps by axial sliding movement without the necessity for the threaded connections described in Fig. 1. When the threaded stud 38' is replaced by a straight spindle, and also when the stud 57 is replaced by an unthreaded shaft section slidable through the cap 13, the adjustment of the two gear pumps may be made by a single control element. As best shown in Fig. 4, the base 1 has mounted thereon, on the outside thereof, a cam 91 which is turnable on a stud 92 projecting from the base, and to the cam is secured a manually movable lever 93. Opposed rods 94 and 95 are axially slidable in hubs 96 and 97 provided by the base, and the inner ends of the rods have rollers 98 and 99 thereon engageable with opposed cam surfaces 100 and 101, being held thereagainst by springs 102 and 103, respectively. The rod 94 is connected by a link 104 to the rod by which a pump similar to the generator of Fig. 1 is connected. It will be understood that where the adjustment is by the structure of Fig. 4, that the threads on the stud 38 are omitted, and this rod is represented in Fig. 4 as an unthreaded stud 38a.

For adjustment of a motor corresponding to the motor which is connected to the driven shaft 12 of Fig. 1, the adjusting rod 57' in Fig. 4 is shown as unthreaded and corresponds otherwise to the rod 57 of Fig. 1. The rod 57' has a pin 105 in the end thereof engaging in a slot 106 in a lever 107 mounted on a pin 108 carried by the base 1. The other end of the lever 107 has a slot 109 engageable with a pin 110 on the rod 95.

In the position of the cam 91 shown, the generator and motor are both completely engaged. As the handle 93 is moved to the left, the cam 91 moves the rod 94 to the left carrying therewith the stud 38a to disengage the gears of the generator to a greater or less degree dependent upon the amount of cam movement. During this movement of the cam the rod 95 remains stationary since the roller 99 engages an arcuate portion of the cam. Movement of the handle 93 to the right, from the mid-position shown, will cause movement of the rod 95 to the right for decreasing the amount of effective tooth area in the gear pump which acts as a motor. When the handle is moved to the right the roller 93 engages an arcuate portion of the cam 91 and the rod 94 is not shifted. By this arrangement it will be apparent that the generator and motor forming part of the transmission may be adjusted for varying the relative rates of rotation of the driving and driven shafts from a single control lever. Obviously the contour of the cam 91 may be changed to assure the proper and proportional adjustments of the generator and motor.

It will be apparent that the generator and motor above described may be replaced by any of the well known types of variable speed transmissions by which to control the relative rates of rotation of the housing 16 and driven shaft 12 or drive shaft 5.

It will be understood that the generator or pump which is connected to the spider or housing 16, may drive the motor which is connected to the drive shaft 5, rather than the motor connected to the driven shaft 12. In this event, since the motor on the driving shaft 5 runs at a constant high speed, the generator must have a relatively large capacity for adjustment. Whether the hydraulic motor driven by the generator is connected to the drive or the driven shaft, the power utilized in driving the motor is in either event returned to the driven shaft, either directly or through the transmission gearing.

I claim:

1. In a variable speed transmission, a driving shaft, a driven shaft, a planetary gearing providing a connection between said shafts, said gearing including a housing in which the planetary gears are positioned, a gear pump connected to the housing and driven thereby, and a second gear pump connected to one of said shafts and driven by fluid under pressure from the first gear pump, one of said gear pumps being adjustable by relative endwise movement between the gears thereof for controlling the relative rates of rotation of the housing and the driven shaft, the discharge side of said first pump being directly connected to the intake of the second pump so that all of the power developed by the first pump may be delivered to the second pump and thereby returned to the transmission.

2. In a variable speed transmission, a driving shaft, a driven shaft, a planetary gearing providing a connection between said shafts, said gearing including a housing in which the planetary gears are positioned, a gear pump connected to the housing and driven thereby, and a second gear pump connected to one of said shafts and driven by fluid under pressure from the first gear pump, said gear pumps being adjustable by relative endwise movement between the gears thereof for controlling the relative rates of rotation of the driving and driven shafts, the discharge side of said first pump being directly connected to the intake of the second pump so that all of the power developed by the first pump may be delivered to the second pump and thereby returned to the transmission.

3. In a variable speed transmission, a driving shaft, a driven shaft, gearing providing a connection between said shafts, said gearing including a housing which by its rotation controls the relative rates of rotation of the shafts, a gear pump connected to the housing and driven thereby and a second gear pump connected to the driven shaft and driven by fluid under pressure from the first gear pump, the discharge side of said first pump being directly connected to the intake of the second pump without throttling, one of said gear pumps being adjustable by a relative axial movement between the gears of the pump, said gear pump which is adjustable having means for maintaining the predetermined relative rates of rotation between the gears of the pump when said gears are disengaged to permit reengagement of the gears while the transmission is operating.

4. In a variable speed transmission, a driving shaft, a driven shaft, gearing providing a connection between said shafts, said gearing including a housing which by its rotation controls the relative rates of rotation of the shafts, a gear pump connected to the housing and driven thereby and a second gear pump connected to the driven shaft and driven by fluid under pressure from the first gear pump, the discharge side of said first pump being directly connected to the intake of the second pump without throttling, said first gear pump including intermeshing gears on spaced shafts, said first gear pump being adjustable by relative endwise movement between the gears of said pump, said shafts having cooperating gears thereon adapted to move into mesh as the pump gears are moved out of mesh, whereby the pump gears continue to rotate in unison and may be reengaged while the transmission is in operation.

5. In a variable speed transmission, a driving shaft, a driven shaft, gearing providing a connection between said shafts, said gearing including a housing which by its rotation controls the relative rates of rotation of the shafts, a gear pump connected to the housing and driven thereby and a second gear pump connected to the driven shaft and driven by fluid under pressure from the first gear pump, the discharge side of said first pump being directly connected to the intake of the second pump without throttling, one of said gear pumps being adjustable for controlling the relative rates of rotation of the housing and the driven shaft, said adjustable gear pump including intermeshing gears and shafts on which the gears are mounted, one of said gears being endwise movable with respect to the other for adjustment of the pump, said shafts having gears thereon adapted to intermesh as the pump gears are moved out of mesh to cause the pump gears to rotate in synchronism when disengaged.

6. In a variable speed transmission, a driving shaft, a driven shaft, gearing providing a connection between said shafts, said gearing including a housing which by its rotation controls the relative rates of rotation of the shafts, a gear pump connected to the housing and driven thereby and a second gear pump connected to the driving shaft and driven by fluid under pressure from the first gear pump, the discharge side of said second pump being directly connected to the intake of the first pump without throttling, one of said gear pumps including a pair of intermeshing gears and shafts on which said gears are mounted, said last pump being adjustable by relative axial movement between the gears, said gear pump, which is adjustable, having means for maintaining the predetermined relative rates of rotation between the gears of the pump when said gears are disengaged to permit reengagement of the gears while the transmission of operating.

7. In a variable speed transmission, a driving shaft, a driven shaft, gearing providing a connection between said shafts, said gearing including a housing which by its rotation controls the relative rates of rotation of the shafts, a gear pump connected to the housing and driven thereby and a second gear pump connected to the driving shaft and driven by fluid under pressure from the first gear pump, the discharge side of said second pump being directly connected to the intake of the first pump without throttling, said first gear pump including intermeshing gears and shafts on which the gears are mounted, said first gear pump being adjustable by a relative axial movement between the gears of the pump, and other intermeshing gears on the shafts of the pump to maintain the predetermined relative rates of rotation between the pump gears when said gears are disengaged to permit reengagement of the gears while the transmission is operating.

LEIF FERSING.